Aug. 11, 1925. 1,549,147
W. R. MYERS
APPARATUS FOR POSITIONING MATERIAL
Filed April 24, 1924 3 Sheets-Sheet 1
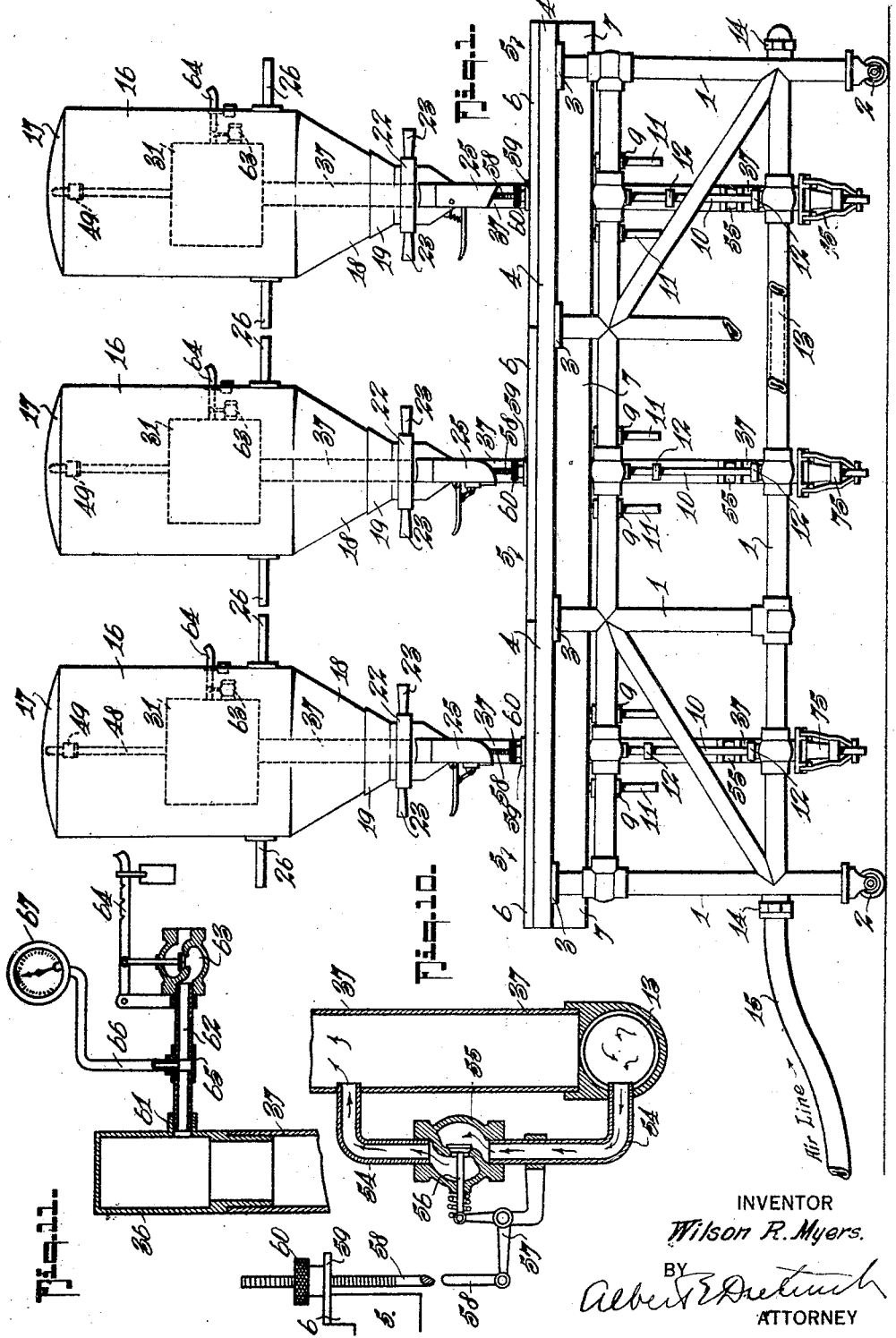
INVENTOR
Wilson R. Myers.
BY
ATTORNEY

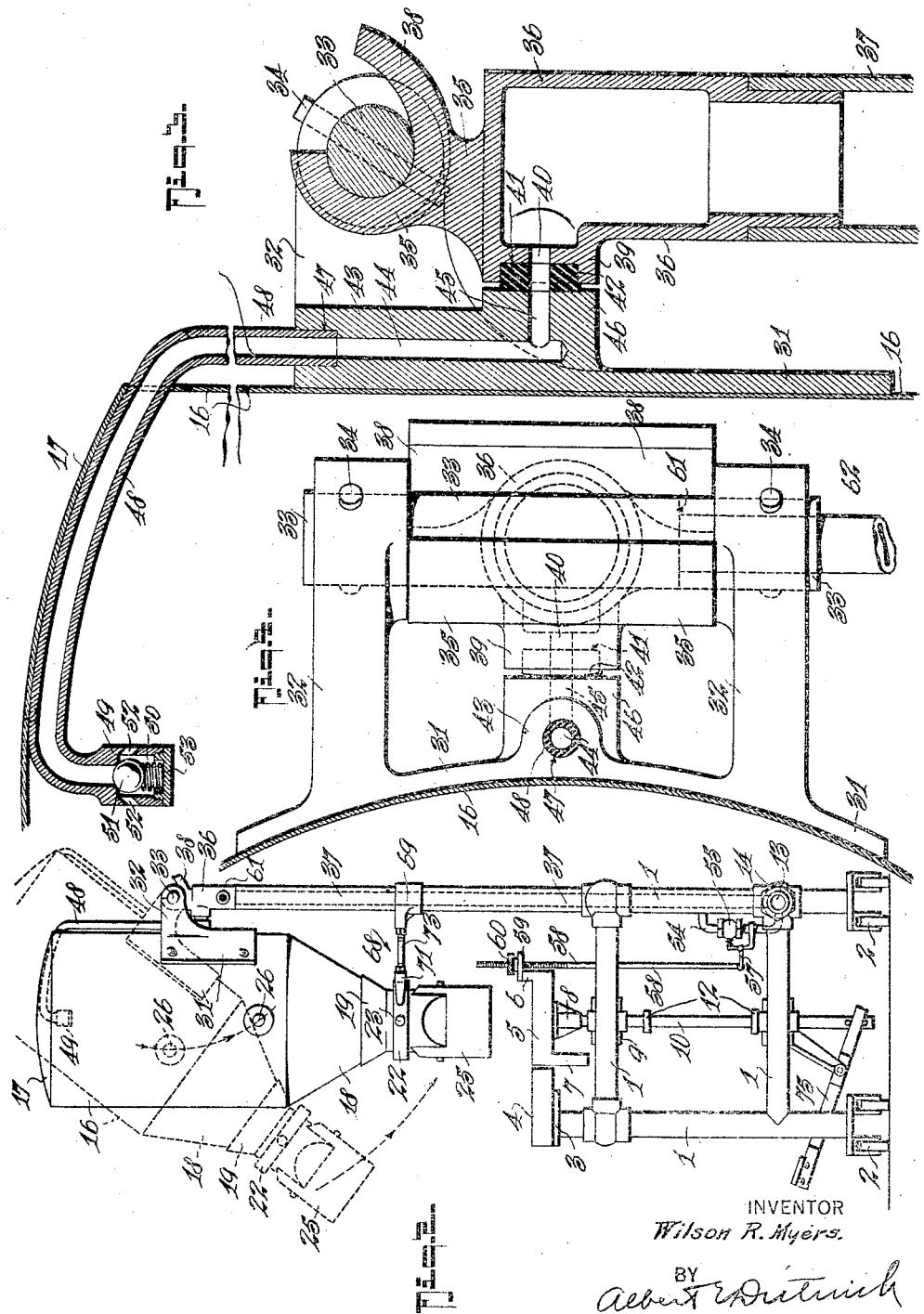

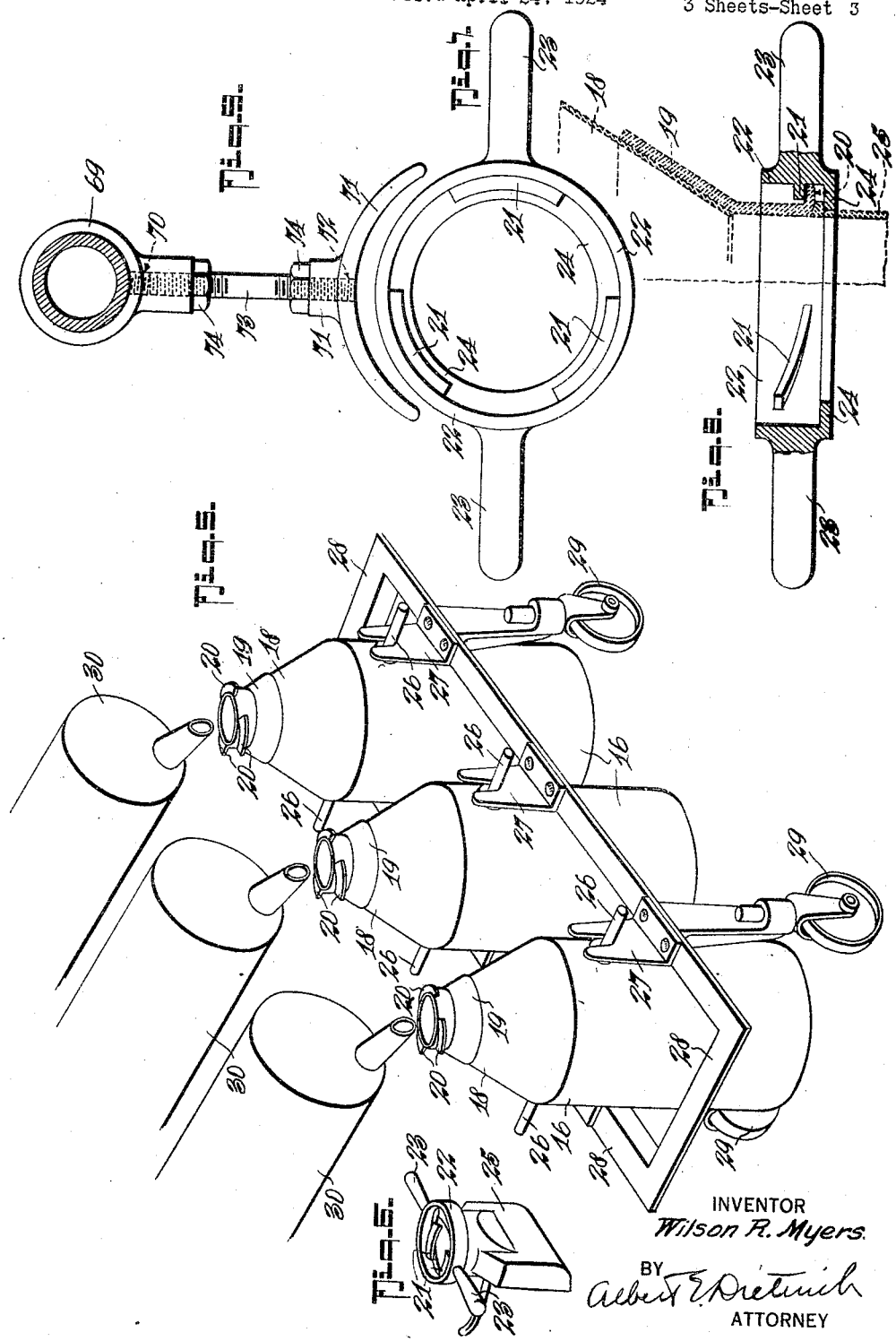

Patented Aug. 11, 1925.

1,549,147

UNITED STATES PATENT OFFICE.

WILSON R. MYERS, OF PORTLAND, OREGON, ASSIGNOR OF ONE-THIRD TO GEORGE W. WEATHERLY AND ONE-THIRD TO GEORGE W. BURT, BOTH OF PORTLAND, OREGON.

APPARATUS FOR POSITIONING MATERIAL.

Application filed April 24, 1924. Serial No. 708,791.

*To all whom it may concern:*

Be it known that I, WILSON R. MYERS, a citizen of the United States, residing at Portland, in the county of Multnomah and State of Oregon, have invented a new and Improved Apparatus for Positioning Material, of which the following is a specification.

The invention relates to apparatus for positioning materials, especially the laying of the layers of which brick ice cream is formed, and generally has for an object to provide certain new and useful improvements over apparatus of the class described in Patent #1,451,431, issued to me under date of April 10, 1923.

In the use of apparatus constructed in accordance with the disclosure of the patent referred to, disadvantage is occasioned in that the reservoirs thereof are adapted for use in actual operation upon the apparatus only, making it necessary that complicated filling openings be provided and that the reservoirs be filled from cans which must be conveyed between the freezers and the apparatus, thus multiplying the cost of manufacture of the necessary parts of the apparatus and also the labor and cost of production of the finished product. I have also found that by using a screw feed for forcing the ice cream mix through the discharge nozzles of the apparatus, the said mix is forced together and compacted thus reducing the swell thereof and increasing the density; also that it is difficult to force out the final portion of a fill of mix after the major portion of the fill has been exhausted without replenishing the supply by an additional filling. To reduce the swell of the mix and thus increase the density thereof is objectionable for economic reasons and also because it detracts from the light quality of the product.

Therefore it is the primary object of my invention to provide a new and improved apparatus in which the reservoirs are readily removable and interchangeable that they may replace the intermediate can fill method, making it possible to use any number of such reservoirs with the single set of discharge nozzles of the particular apparatus, the improved construction of the reservoirs and other apparatus parts being such as to also make it possible to discharge the mix from the reservoirs by air pressure, thus preventing all compacting of the mix and for so aerating the same while discharging it as to insure a deliciously light product.

The invention further has for its object to provide means for controlling pressure of the air for discharging the mix automatically in accordance with the operation of the apparatus in positioning the material and also for regulating the pressure of the air to the degree desired in accordance with the state of the mix.

With the above and other objects in view that will hereinafter appear, the invention further resides in those novel details of construction, combination and arrangement of parts, all of which will be first fully described, then be particularly pointed out in the appended claims, reference being had to the accompanying drawings, in which:—

Figure 1 is a front elevation of the invention.

Figure 2 is an end elevation.

Figure 3 is an enlarged detail fragmentary section of one reservoir and the removable mounting therefor, the air discharge connections being also shown.

Figure 4 is a plan view of the mounting parts shown in Figure 3.

Figure 5 is a perspective view of a set of reservoirs shown mounted upon a truck frame for transporting the same between freezer and positioning apparatus.

Figure 6 is a detail perspective view of one of the removable discharge nozzles.

Figure 7 is a plan view of one of the discharge nozzle clamping rings.

Figure 8 is a detail cross section of the clamping ring shown in Figure 7, parts of the reservoir throat collar and the nozzle being shown in dotted lines.

Figure 9 is an enlarged plan view of the adjustable supporting stop.

Figure 10 is a diagrammatic section illustrating the automatic by-pass valve air control.

Figure 11 is a diagrammatic section illustrating the air relief valve and gauge connections.

In the drawings, in which like numerals of reference indicate like parts in all of the figures, 1 indicates the framing of the apparatus and it is somewhat similar in construction to the major portions of the framing in the disclosure of my Patent #1451-431. This framing is preferably constructed of hollow tubing, as shown.

The framing 1 is preferably mounted on casters 2 for convenience in moving the apparatus about and includes bracket plates 3 to which the front or stationary portion 4 of the table is fixed.

To the rear of the fixed portion of the table are the several sections 5 of that part of the table which is adapted to be raised and lowered to bring the molds (pans) into proper relation to the main nozzles.

The movable sections 5 of the table (there being one for each unit) each consists of a flat bed 5 whose top surface registers with that of the fixed bed 4, when the bed 5 is in the lowered position.

The bed 5 has a flange 6 along its rear edge against which the molds are actuated and it has a front apron 7 to guard against the operator getting his fingers between the fixed and movable beds when the latter are elevated.

Each bed section 5 is secured to a fixture 8 which has rods 10—11 passing through guide bearings in the attachment 9 which is permanently fastened to the framing 1 in any suitable manner, the rods 11 being short ones (see Figures 1 and 2), while the rod 10 is a long lift rod which projects down through the guide bearing also made secure on the framing 1, and is connected, at its lower end, with the foot lever that is fulcrumed on the arm which projects from the bearing.

Adjustable collars 12 are provided on the lift rod 10 to properly position the respective table sections 5 in their lowered and elevated positions.

By reference to the patent above referred to, it will be observed that all of the structure thus far described is the same as the structure there disclosed, it being understood that the function of the parts is the same and that further detailed description thereof is unnecessary for that reason.

It is particularly desirable that the lower rear pipe section 13, comprising a portion of the framing 1, be of hollow tubing construction for the purpose of providing a main air reservoir. This pipe section 13 has suitable coupling sections 14 at the ends thereof for facilitating a connection therewith of an air line conduit pipe 15 for supplying compressed air to the said pipe section, the purpose for which will later become apparent.

A plurality of reservoirs 16 are provided, three being shown, each including a closed bottom 17 and serving as a part of an individual layer laying unit. It will be understood that when my improved apparatus is used for the purpose principally disclosed in the patent referred to,—that of forming brick ice cream—the reservoirs 16 are adapted to receive the mix directly from the freezers. For this purpose, the said reservoirs are removably supported upon the vertical posts 37, which form a part of the framing 1 and constitute vertical projections therefrom, and are provided with filling and discharging throatways 18 and are removably mounted upon the said supporting posts 37.

Each reservoir includes a collar 19 secured to the throatway 18 thereof and which is provided with a plurality, three being shown, of clamp lugs or interrupted threads 20, which are adapted to cooperate with similar lugs 21 formed on the clamp ring 22, which is provided with turning handles 23 and a suitable flange 24 whereby the nozzle structures 25 may be secured thereto. It will be observed that the nozzle and clamp ring structures are units, such a unit being removably cooperative with each reservoir 16. The structure and function of the nozzle structures 25 being the same as fully disclosed in my patent hereinbefore referred to, further description thereof is deemed unnecessary.

As hereinbefore stated, the reservoirs 16 are removably supported by the vertical supports 37, in a manner hereinafter described more fully, and by reason of the fact that the nozzle structures are readily removable from their cooperative reservoir or reservoirs, it is obvious that each reservoir may be used both as such in actual operation upon the apparatus or as a transporting medium to receive the mix directly from the freezer and for transporting the same to and for suspending the same above and in cooperative relation upon the apparatus. This feature of the invention is very clearly illustrated in Figures 5 and 6 of the drawings, in the former of which a plurality of the said holding and transporting reservoirs are shown in filling relation with a series of freezers and upon a suitable wheeled carrying frame.

For providing for the double use of the reservoirs 16, I provide each thereof with a pair of laterally projecting supporting and lifting handles whereby the said reservoirs may be suitably supported upon the brackets 27 mounted upon the rectangular carrying frame 28, as illustrated in the said Figure 5 of the drawings. The frame 28, it will be observed, is suitably supported upon wheels 29 for facilitating movement of the same in effecting transportation of the reservoirs between freezers and laying apparatus. In the said Figure 5, the freezers are diagrammatically shown and are indicated by the numeral 30.

By thus providing reservoirs so constructed as to be readily removable from the apparatus and being provided with removable nozzles, it is possible to effect a great saving. Obviously only three nozzle structures are necessary in an apparatus such as is illustrated in the drawings, while it is possible to use any number of the removable transporting and holding reservoirs. This does away with the drawing off of the ice cream mix from the freezers in containers other than the reservoirs themselves and transferring the same to the said reservoirs on the apparatus, and not only eliminates loss of material but saves the duplication of operations and the labor incident thereto.

Describing in detail the means whereby the reservoirs are supported upon the standard 37 in a manner for being readily removable therefrom, attention is called to the support brackets 31, one of which is secured to each of the reservoirs 16 and each of which includes extended hub carrying arms 32 to provide supporting means for the pivot shaft section 33, which is pin connected as at 34 to be securely held by the hubs of the said arms 32. The bracket devices thus far explained are adapted to cooperate with the open bearing head 35 formed on the top portion of the conduit head section 36, which is secured to the top portion of the supporting standard 37 and which, like the standard itself, is hollow for a purpose later to be described.

The open bearing head 35 is adapted to removably receive and accommodate, to form a pivot bearing, the pivot shaft section 33, and for facilitating the ready mounting of the reservoir in pivotal relation upon the said head, the latter is provided with an extended lip 38, see Figures 3 and 4 of the drawings.

The head section 36 includes an extension 39 provided with an air discharge orifice 40 and a socket 41 to receive an apertured washer 42, of rubber or other suitable material, to provide a yieldable air leakage preventing means.

The bracket 31 also includes an extension 43 which is bored vertically as at 44 and which communicates with the horizontal bore 45 formed in the hub-like portion 46 of the said extension to provide an air duct adapted to communicate with the discharge orifice 40 and the hollow interior of the head 36 of the standard 37 when the reservoir is mounted upon the said standard.

The extension 43 is also counterbored as at 47 to provide suitable connections for the conduit pipe 48 which projects therefrom and extends into the interior of the reservoir 16 along the contour of the closed bottom 17 thereof where the said pipe is shaped to form a depending head 49 which is enlarged to provide a back check valve chamber 50 in which operates the spring pressed back check valve 51. The head 49 is provided with discharge orifices 52 and a removable cap 53. This pipe 48 and head 49 serve to provide for suitable delivery of compressed air into the reservoir and also to prevent the ice cream mix from forcing its way into the said pipe when the said reservoirs are being filled from the freezers.

The main air conduit formed by the frame pipe 13 is not in communication with the vertical conduits formed by the supporting standards 37 but the conduit of each of said standards is in communication with the said main conduit through the medium of the by-pass connections 54 into which is placed the control valve 55. The valve stem 56 of each said valve 55 is joined to one end of the bell crank lever 57, the other end of which has secured thereto a vertical valve actuating rod 58 which passes freely through the plate 59 secured on top of the flange 6 of the respective table section 5 and is threaded to accommodate the thumb nut 60. Thus the by-passing of compressed air from the main conduit 13 to the respective vertical conduit 37, and therethrough into the respective reservoir, is controlled by the movement of the respective table section 5. As the operator presses the respective foot lever device 75, in order to effect the desired elevation of the cooperative table section in the manner and for the purpose best described in my patent before referred to, the said movement of the table will cause by-passing of the compressed air into the conduits leading into the reservoir in the manner hereinbefore described. It is obvious that by adjusting the thumb nut 60, the point at which the plate 59 will engage the same to actuate the rod may be varied so that the degree of opening of the valve 55, and consequently the pressure of air therethrough, may be varied to suit the requirements due to the state of the mix. It will be understood that if the mix is a little soft it will not require as much air pressure as when frozen stiff.

Each head 36 includes a lateral extension 61 which serves to accommodate the connection, in communication with that head, of a lateral conduit pipe 62 which communicates with the relief valve 63, weight controlled as at 64, and whereby relief of over pressure may be had when necessary.

A T-coupling 65 is spliced into the lateral conduit 62 and serves as a connecting medium for the conduit pipe 66 leading to the pressure indicator 67 which serves its obvious purpose.

When the reservoirs are removed from the wheeled carrying frame 28, the handles 26 provide a means for facilitating the said removal thereof and for the positioning of the reservoir upon the open receiving bracket head 35. After the pivot shaft section 33 is brought into cooperative relation with the open bearing head 35, the whole reservoir structure is turned over on the pivot thus formed in the direction indicated by the dotted lines and arrows in Figure 2 of the drawing, it being understood, of course, that the removable nozzle has been applied thereupon before this inversion of the said reservoir.

As the reservoir is allowed to swing down on its pivot, as indicated in the figure referred to, the structure comes into contact with or abuts a suitable supporting stop 68, which is secured upon the vertical standard 37 in position for being so engaged. Each stop includes a hub portion 69 adapted to be secured upon the respective standard 37, and this hub includes an extension having a threaded socket 70. The stop also includes an engaging portion 71 shaped to conform with the curvature of the engaging portion of the reservoir unit structure, and which said engaging portion also includes an extended hub which includes a threaded socket 72. The threaded sockets 70 and 72 are adapted to accommodate the threaded ends of the rod 73 in a manner whereby turning of the said rod in the sockets will effect an adjustment of the said supporting stop to provide for extending or contracting the length thereof to thus provide for perfect positioning of the nozzle 25 with relation to the respective movable table section 5. Jam nuts 74 may be provided on the said rod 73 for securing the parts to the adjusted positions. It will be obvious from Figures 2, 3, and 4 of the drawings, that when the reservoir is mounted upon the apparatus in the manner indicated in the said Figure 2, the weight of the said reservoir, acting pivotally, will be distributed against the washer 42 in a manner for preventing all possibility of air leakage.

In operation, as the operator presses down on the pedal structure 75, thus effecting vertical movement of the table 5 for the purpose disclosed in detail in my patent hereinbefore referred to, the said table movement will effect an opening of the valve 55 and effect by-passing of the compressed air from the main conduit 13 into the respective one of the vertical conduits 37 and therethrough, through orifice 40 of washer 42, ducts 45 and 44, conduit pipe 48 and orifices 52 into the respective reservoir and against the mix therein, in a manner for effecting the desired discharging of the mix thereof through the throatway 18 and respective nozzle structure 25.

From the foregoing description, taken in connection with the accompanying drawings, it is thought that the novel details of construction, manner of operation and advantages of my invention will be readily apparent to those skilled in the art to which it relates.

What I claim is:—

1. In apparatus of the class described, a supporting frame, a reservoir mounted on the frame and adapted to receive the mix, and a two-part air conducting means so constructed and positioned that the weight of the reservoir will be distributed upon the connection between the parts for preventing air leakage and whereby compressed air may be delivered into said reservoir for discharging the mix therefrom.

2. In apparatus of the class described, a supporting frame, a reservoir removably mounted on the frame and including a closed end and a discharge end and adapted to receive the mix, a discharge nozzle cooperative with said reservoir, means for detachably securing said nozzle to said reservoir and means for admitting compressed air into said reservoir in a manner for effecting a discharge of the mix therefrom.

3. In apparatus of the class described, a supporting frame, a reservoir removably mounted on the frame and including a closed end and a filling and discharge throatway and adapted to receive the mix, a discharge nozzle removably mounted in communication with said discharge throatway, and means for admitting compressed air into said reservoir in a manner for effecting a discharge of the mix therefrom.

4. In apparatus of the class described, a supporting frame, a reservoir removably mounted on the frame and including a closed end and a filling and discharge throatway and adapted to receive the mix, a discharge nozzle removably mounted in communication with said discharge throatway, and a two-part air conducting means so constructed and positioned that the weight of the reservoir will be distributed upon the connection between the parts for preventing air leakage and whereby compressed air may be delivered into said reservoir for discharging the mix therefrom.

5. In apparatus of the class described, a supporting frame, a reservoir mounted on the frame and adapted to receive the mix, and a two-part air conducting means so constructed and positioned that the weight of the reservoir will be distributed upon the connection between the parts for preventing air leakage and whereby compressed air may be delivered into said reservoir for discharging the mix therefrom, a portion of said frame constituting a part of said air conducting means.

6. In apparatus of the class described, a supporting frame, a reservoir mounted on the frame and having a discharge throatway and adapted to receive the mix, a table movable in cooperative relation with the reservoir in effecting the desired positioning of the mix, discharged therefrom, means for admitting compressed air into said reservoir in a manner for effecting a discharge of the mix therefrom, and means operated by engagement with the table for controlling the admission of said air into said reservoir in accordance with the table movement.

7. In apparatus of the class described, a supporting frame, a reservoir mounted on the frame and having a discharge throatway and adapted to receive the mix, a table movable in cooperative relation with the reservoir in effecting the desired positioning of the mix discharged therefrom, a two-part air conducting means so constructed and positioned that the weight of the reservoir will be distributed upon the connection between the parts for preventing air leakage and whereby compressed air may be delivered into said reservoir for discharging the mix therefrom, and means actuated by the movable table for controlling the admission of compressed air through said conducting means into said reservoir in accordance with the movement of said table.

8. In apparatus of the class described, a supporting frame, a reservoir mounted on the frame and having a discharge throatway and adapted to receive the mix, a table movable in cooperative relation with the reservoir in effecting the desired positioning of the mix discharged therefrom, means for admitting compressed air into said reservoir in a manner for effecting a discharge of the mix therefrom, means for controlling the admission of said air into said reservoir in accordance with the table movement, and means for varying the controlling action of said controlling means.

9. In apparatus of the class described, a supporting frame, a reservoir mounted on the frame and having a discharge throatway and adapted to receive the mix, a table movable in cooperative relation with the reservoir in effecting the desired positioning of the mix discharged therefrom, a two-part air conducting means so constructed and positioned that the weight of the reservoir will be distributed upon the connection between the parts for preventing air leakage and whereby compressed air may be delivered into said reservoir for discharging the mix therefrom, means actuated by the movable table for controlling the admission of compressed air through said conducting means into said reservoir in accordance with the movement of said table, and means for varying the controlling action of said controlling means.

10. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, and means for admitting compressed air into said reservoir in a manner for effecting a discharge of the mix therefrom.

11. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, means for admitting compressed air into said reservoir in a manner for effecting a discharge of the mix therefrom, and a nozzle removably mounted in communication with said reservoir throatway and adapted for controlling the flow of mix therefrom.

12. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, means for admitting compressed air into said reservoir in a manner for effecting a discharge of the mix therefrom, and means for controlling the flow of said air into said reservoir in accordance with the table movement.

13. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, means for admitting compressed air into said reservoir in a manner for effecting a discharge of the mix therefrom, means for controlling the flow of said air in accordance with the table movement, and a nozzle removably mounted in communication with said reservoir throatway and adapted for controlling the flow of mix therefrom.

14. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, a two-part air conducting means so constructed and positioned that the weight of the reservoir will be distributed upon the connection between the parts for preventing air leakage and whereby compressed air may be delivered into said reservoir for discharging the mix therefrom, and means actuated by the movable table for controlling the admission of compressed air through said conducting means into said reservoir in accordance with the movement of said table.

15. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, a two-part air conducting means so constructed and positioned that the weight of the reservoir will be distributed upon the connection between the parts for preventing air leakage and whereby compressed air may be delivered into said reservoir for discharging the mix therefrom, means actuated by the movable table for controlling the admission of compressed air through said conducting means into said reservoir in accordance with the movement of said table, and means for varying the controlling action of said controlling means.

16. In apparatus of the class described, a supporting frame, a reservoir mounted on the frame and adapted to receive the mix, a two-part air conducting means so constructed and positioned that the weight of the reservoir will be distributed upon the connection between the parts for preventing air leakage and whereby compressed air may be delivered into said reservoir for discharging the mix therefrom, and means associated with the said two-part means for providing an open pivot connection between said reservoir and frame whereby said reservoir may be readily removed.

17. In apparatus of the class described, a supporting frame, a reservoir mounted on the frame and adapted to receive the mix, a two-part air conducting means so constructed and positioned that the weight of the reservoir will be distributed upon the connection between the parts for preventing air leakage and whereby compressed air may be delivered into said reservoir for discharging the mix therefrom, means associating with the said two-part means for providing an open pivot connection between said reservoir and frame whereby said reservoir may be readily removed, and an adjustable supporting stop secured to the frame and adapted to be abutted by the reservoir to hold the latter at proper position.

18. In apparatus of the class described, a supporting frame, a reservoir removably mounted on the frame and provided with a closed end and a filling and discharge throatway, means for delivering compressed air into the closed end of the reservoir to effect a discharging of the mix therefrom, a portion of said frame being hollow to provide a main air conduit, another portion of said frame being hollow to provide a supplemental air conduit in communication with the air delivery means but not with the main conduit, and means for by-passing air from the main to the supplemental conduit when desired.

19. In apparatus of the class described, a supporting frame, a reservoir removably mounted on the frame and provided with a closed end and a filling and discharge throatway, a table movable in cooperative relation with the reservoir in effecting the desired positioning of the mix discharged therefrom, means for delivering compressed air into the closed end of the reservoir to effect a discharging of the mix therefrom, a portion of said frame being hollow to provide a main air conduit, another portion of said frame being hollow to provide a supplemental air conduit in communication with the air delivery means but not with the main conduit, means for by-passing air from the main to the supplemental conduit when desired, the said last named means being controlled by movement of the table.

20. In apparatus of the class described, a supporting frame, a reservoir mounted on the frame and adapted to receive the mix, means for admitting compressed air into said reservoir in a manner for effecting a discharge of the mix therefrom, the said means including a two-part pivot bracket, one part of which is supported by the frame, the other by the reservoir, the said parts having registering air ducts.

21. In apparatus of the class described, a supporting frame, a reservoir mounted on the frame and adapted to receive the mix, means for admitting compressed air into said reservoir in a manner for effecting a discharge of the mix therefrom, the said means including a two-part open pivot bracket, one part of which is supported by the frame, the other by the reservoir, the said parts having registering air ducts, and an apertured washer between the parts and upon which the weight of the reservoir is distributed to provide air-tight communication.

22. In apparatus of the class described, a supporting frame, a reservoir mounted on the frame and adapted to receive the mix, means for admitting compressed air into said reservoir in a manner for effecting a discharge of the mix therefrom, the said means including a two-part pivot bracket, one part of which is supported by the frame, the other by the reservoir, the said parts having registering air ducts, a portion of the frame being hollow to form a main air conduit, another portion of the frame being hollow to provide a supplemental air conduit in communication with the said air ducts but not with the main air conduit, and means for by-passing the air from the main to the supplemental conduit when desired.

23. In apparatus of the class described, a supporting frame, a reservoir mounted on the frame and adapted to receive the mix, a table movable in cooperative relation with the reservoir in effecting the desired positioning of the mix discharged therefrom, means for admitting compressed air into said reservoir in a manner for effecting a discharge of the mix therefrom, the said means including a two-part pivot bracket, one part of which is supported by the frame, the other by the reservoir, the said parts having registering air ducts, a portion of the frame being hollow to form a main air conduit, another portion of the frame being hollow to provide a supplemental air conduit in communication with the said air ducts but not with the main air conduit, means for by-passing air from the main to the supplemental conduit when desired, the said last named means being controlled by movement of the table.

24. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, and a two-part air conducting means so constructed and positioned that the weight of the reservoir will be distributed upon the connection between the parts for preventing air leakage and whereby compressed air may be delivered into said reservoir for discharging the mix therefrom.

25. In apparatus of the class described, a supporting frame, a reservoir removably mounted on the frame and provided with a closed end and a filling and discharge throatway, handles on said reservoir for facilitating removal and inversion thereof for filling the same with the mix to be discharged therefrom, a two-part air conducting means so constructed and positioned that the weight of the reservoir will be distributed upon the connection between the parts for preventing air leakage and whereby compressed air may be delivered into said reservoir for discharging the mix therefrom, and a nozzle removably mounted in communication with said reservoir throatway and adapted for controlling the flow of mix therefrom.

26. In apparatus of the class described, a supporting frame, a reservoir to receive the mix and having a controlled outlet passage for the mix, a two-part air conducting means, one part of which is located on the frame and the other on the reservoir, means mounting the reservoir on the frame to cause the weight of the reservoir to hold said two-parts in tight engagement whereby the air may be delivered to the reservoir to effect a discharge of the mix therefrom when said controlled outlet is open.

WILSON R. MYERS.